United States Patent [19]

Kubota et al.

[11] Patent Number: 5,075,814
[45] Date of Patent: Dec. 24, 1991

[54] EXTERNAL METHOD AND APPARATUS FOR MAGNETIZING METAL PIECES IN ROTARY ELECTRIC APPARATUS TO A PERMANENT MAGNETIZATION STATE

[75] Inventors: Toshiharu Kubota, Akabori; Atsushi Tsuzaki; Yoshiyuki Yokoyama, both of Ota; Saburo Kimura, Kiryu, all of Japan

[73] Assignee: Mitsuba Electric Manufacturing Company Ltd., Gunma, Japan

[21] Appl. No.: 481,192

[22] Filed: Feb. 20, 1990

[30] Foreign Application Priority Data

Feb. 20, 1989 [JP] Japan .................................. 1-39708

[51] Int. Cl.$^5$ ............................................. H01F 7/20
[52] U.S. Cl. .................................... 361/143; 335/284; 29/596
[58] Field of Search ........................ 361/143, 146, 147; 335/284; 29/596–598, 607–609, 732; 318/138, 685, 254, 439, 135; 310/49 R, 154, 42

[56] References Cited

U.S. PATENT DOCUMENTS

| 4,039,853 | 8/1977 | Koizumi et al. | 307/101 |
| 4,648,004 | 3/1987 | Richter et al. | 361/143 |
| 4,748,535 | 5/1988 | Arawaka et al. | 361/148 |

Primary Examiner—J. R. Scott
Assistant Examiner—David Osborn
Attorney, Agent, or Firm—Oliff & Berridge

[57] ABSTRACT

An external magnetizing method and external magnetizing apparatus for a rotary electric apparatus having internal permanent magnets, which obtains permanent magnetization of metal pieces fixed along the internal circumference of a yoke from the outside of the yoke while the rotor is situated within the yoke. The external magnetizing method includes the steps of creating the permanent magnets by applying a voltage from a capacitor power source to a yoke magnetizing device adjacent the external circumference of the motor yoke, then incrementally rotating the rotor in its normal rotating direction and thereafter reapplying the capacitor power source voltage to the yoke magnetizing means to again magnetize the metal pieces to obtain a more uniform magnetization when using a capacitor power supply. The external apparatus includes a yoke magnetizing device adjacent the external circumference of the yoke, a power source voltage applying device for supplying a voltage from a capacitor power source to the yoke magnetizing device, and a step rotating device controlled by the power source applying device for incrementally rotating the rotor at least one or more times in its normal rotating direction after each application of voltage from the capacitor power source.

2 Claims, 3 Drawing Sheets

EXTERNAL METHOD AND APPARATUS FOR MAGNETIZING METAL PIECES IN ROTARY ELECTRIC APPARATUS TO A PERMANENT MAGNETIZATION STATE

BACKGROUND OF THE INVENTION

The present invention relates to an external magnetizing method and an external magnetizing apparatus for rotary electric apparatus using permanent magnets, in which magnetization of metal pieces to a permanent magnetization state is accomplished under the condition that a rotor is situated within the motor yoke.

In general, the magnetization of metal pieces in a rotary electric apparatus to a permanent magnetization state is sometimes accomplished by using an external magnetizing apparatus while the rotor is situated within the motor yoke. Moreover, the conventional external magnetizing apparatus is constructed such that magnetization of the metal pieces which become the permanent magnets is accomplished by applying a power source to a magnetizing coil wound around a magnetizing yoke. However, nowadays, it is desired, with a resulting improved performance of the permanent magnet itself, to apply a high level current for magnetization. It is essential, for this purpose, to enhance the magnetizing efficiency by winding a large diameter magnetizing coil. The magnetizing coil inevitably needs to be large in diameter in order to reduce the resistance of the magnetizing coil for obtaining the necessary current. This results in a disadvantage in that multipolarity (i.e., the magnetization of a plurality of pole magnets) becomes substantially difficult due to interference between an adjacent coil and any cooling apparatus. Consequently, it is only possible to polarize a maximum of about four poles.

It has previously been proposed that a capacitor power source be used in place of a rectifying power source as the magnetizing power source to create the permanent magnets. However, since a capacitor power source can only supply power over a short period of time (unlike the continuous application of power which may be done with a rectifying power source) magnetization is conducted nonuniformly requiring certain countermeasures and a method to solve such problems has not yet been proposed.

SUMMARY OF THE INVENTION

With the background explained above, it is an object of the present invention to provide an external magnetizing method and an external magnetizing apparatus for rotary electric apparatus that use permanent magnets which can solve such problems. First, the external magnetizing method is characterized, for magnetization of metal pieces fixed along the internal circumference of a yoke from the outside of the yoke while the rotor is situated within the yoke in that the metal pieces which become the permanent magnets are magnetized to a permanent magnetization condition by applying a voltage produced by a capacitor power source to a yoke magnetizing means adjacent the external circumference of the yoke. The rotor is thereafter rotated step by step (i.e., incrementally) in its normal rotating direction and the metal pieces are magnetized to the permanent magnetization state by applying the capacitor power source to said yoke magnetizing means.

Moreover, the magnetizing apparatus is an external magnetizing apparatus for a rotary electric apparatus having internal permanent magnets. The apparatus obtains magnetization of the metal pieces fixed along the internal circumference of a yoke from outside of the yoke while a rotor is situated within the yoke. The apparatus comprises a yoke magnetizing means in contact with the external circumference of the yoke, a power source applying means for supplying a capacitor power source to said yoke magnetizing means and a step rotating means for incrementally rotating said rotor at least one or more times in its normal rotating direction.

With such construction, the present invention proposes an external magnetizing apparatus which prevents generation of nonuniform magnetization while using a capacitor power source.

These and other objects and features of the present invention will become apparent from the following description taken in conjunction with the preferred embodiment thereof with reference to the accompanying drawings

BRIEF DESCRIPTION OF THE DRAWINGS

The invention will be discussed with reference to the following FIGS. wherein.

DETAILED DESCRIPTION OF THE PREFERRED EMBODIMENTS

Figure 1:
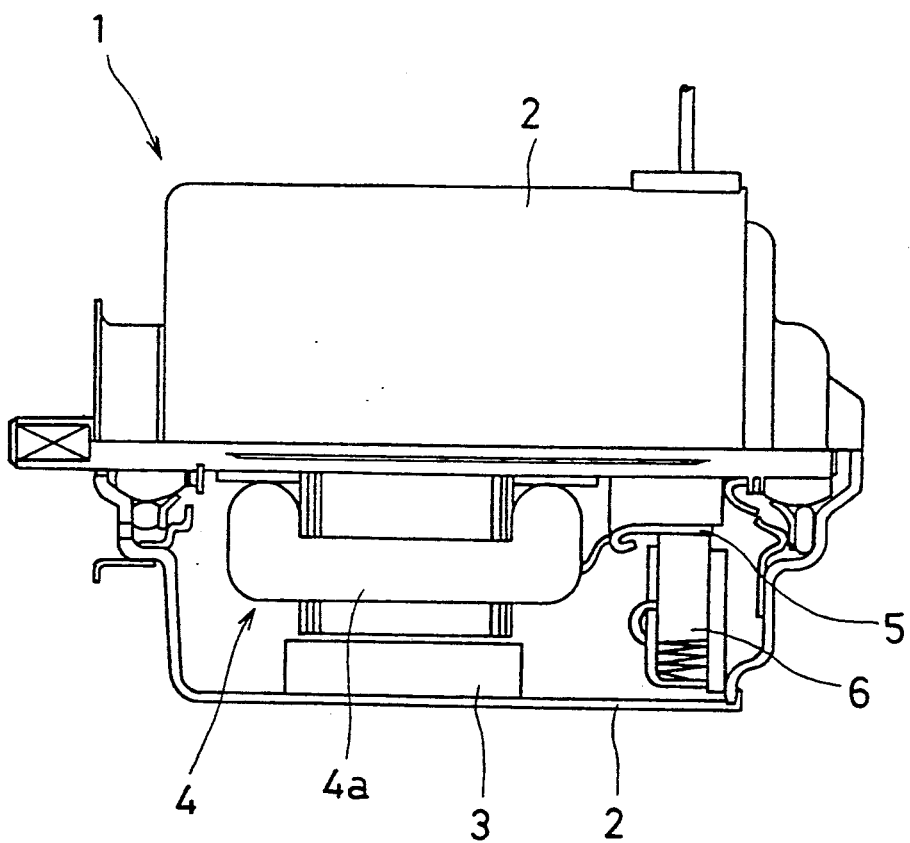
FIG. 1 i a sectional view of a motor.

An embodiment of the present invention will be explained with reference to the accompanying drawings. As used herein, the phrase "metal pieces" is intended to mean any material capable of becoming magnetized. In the Figures, the reference numeral 1 designates an electric motor, which comprises at least a pair of permanent magnets (stator) 3 fixed to the internal surface of the yoke 2, a rotor 4 which is rotatable about its axis within the yoke 2, a commutator 5 provided to the rotor 4 and a member such as a brush 6 slidably provided like a spring to the commutator 5.

Figure 3:
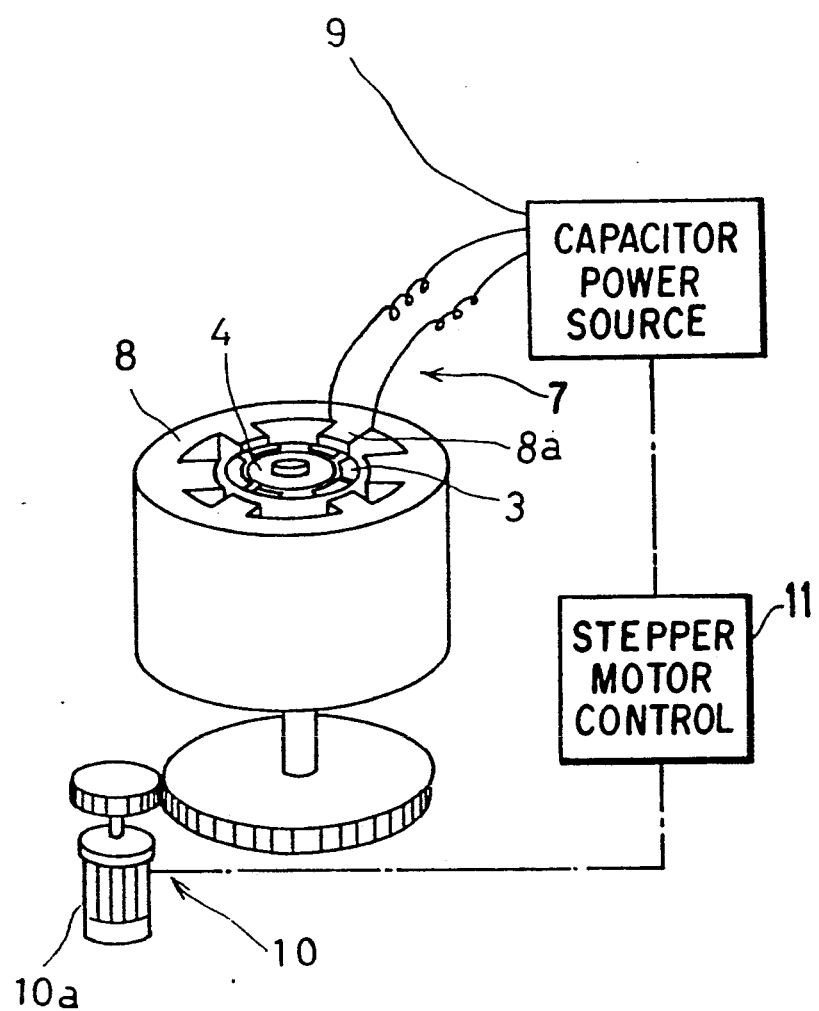
FIG. 3 is a schematic perspective view indicating the magnetizing condition.

Meanwhile, the reference numeral 7 (FIG. 3) designates an external magnetizing apparatus for creating permanent magnets 3 from the outside of motor yoke 2. This external magnetizing apparatus comprises: a magnetizing yoke means 8 in which the end piece (internal end) of an iron core 8a is provided close to the external circumference of the motor yoke 2 and a around which magnetizing coil 8b is wound; a capacitor power-source applying means 9 for applying power to the magnetizing coil 8b; and a step rotating means 10 which supports a motor 1 and rotates, step by step, the rotor 4 of motor 1 in its normal rotating direction. In this embodiment, the rotating means 10 is set to cause step rotation, namely the intermittent rotation for a specified angle, during every period of time when the capacitor power source does not supply a voltage to the magnetizing coil 8b. For this purpose, the step rotating means 10 is electrically controlled in response to capacitor power source applying means 9 through the control means 11 and employs a stepping motor 10a which is controlled in the rotating operation. The control means 11, using circuitry well known in the art, is responsive to capacitor power source applying means 9 to activate stepping motor 10a whenever power is not being applied to the magnetizing yoke means 8. Thus, the capacitor power source applying means 9 indirectly controls the activation of the step rotating means 10 through the control means 11 in the manner discussed below.

In the embodiment of the present invention constituted as explained above, the metal pieces which form the permanent magnets 3 are magnetized from an external circuit with the rotor 4 in place inside the motor yoke 2. As such, a voltage produced by a capacitor power source is applied to the magnetizing coil 8b. Since the capacitor power source inherently generates a high voltage (for example, about 1000 volts), the diameter of wire forming the magnetizing coil 8b can be reduced. Accordingly, use of a capacitor power source with the magnetizing yoke means solves the problem of interference between adjacent magnetizing pole, members and allows for multipolarization.

Moreover, the rotor 4 is caused to make a stepping rotation during magnetization. As such, since power application time is of short duration for a capacitor power source, the region magnetized once by the capacitor power source is also small Therefore, in the case where magnetization is carried out while the rotor 4 is rotated continuously, and the rotating speed is synchronized with the peak value of capacitor power source, a magnetic field is formed in a zig-zag pattern through teeth 4a of the rotor 4 and the gap 4b separating the teeth 4a (i.e., the magnetic flux path weaves between teeth 4a of rotor 4 and the gap 4b separating teeth 4a). The magnetic flux used for magnetization converges on the rotor teeth 4a because of their lower magnetic resistance compared to the adjacent rotor gap 4b and, as a result, the metal pieces forming the permanent magnets 3 have a tendency to become magnetized nonuniformly in a stripped magnetization pattern. However, in the present invention, nonuniform magnetization can be eliminated by conducting the magnetization under the condition that after the metal pieces are initially partially magnetized to a permanent magnetization state, the rotor 4 is incrementally rotated by an external force other than the capacitor power source (namely, motor 10a), and the rotor teeth 4a having a lower magnetic resistance are displaced incrementally by step rotation of rotor 4 to a position where a low magnetic flux density of the partially magnetized metal pieces resides. In this case, when displacement of rotating angle of rotor 4 is set to the half pitch of rotor teeth 4a, the corresponding gap parts of the rotor 4, for example gap 4b, displace to the position of the previous pulse peak of the capacitor power source (i.e., the positions of high magnetic flux density) during each subsequent magnetization and thereby additional magnetization can be conducted to the part of low magnetic flux density and a high performance permanent magnet having a uniform magnetization can be formed.

Figure 2:
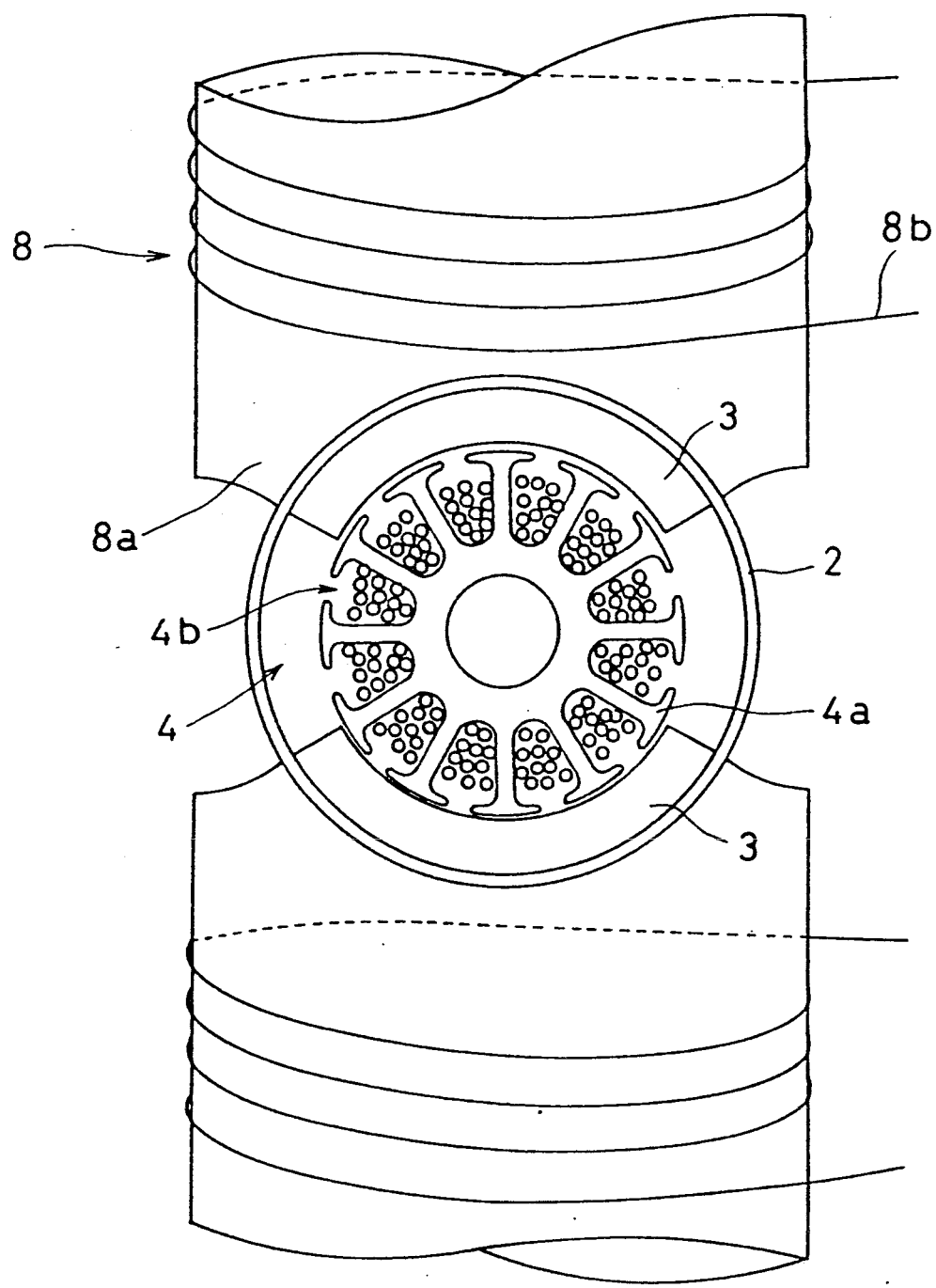
FIG. 2 sectional view of a yoke.

Moreover, in this permanent magnet, magnetization may be made, as shown by the overlapped areas of the rotor teeth 4a and magnet 3 in, for example, FIG. 2, by making the incremental rotating angle of rotor 4 smaller than the half pitch angle mentioned above. At any rate, an improved permanent magnet 3, which realizes further reliable unification of magnetic path for magnetization and results in uniform magnetization, can be accomplished by magnetization through multiple repetitions of the above process (i.e., magnetization by stepping the teeth 4a of rotor 4 toward the part of low magnetic flux density of the permanent magnet 3 as magnetized). Moreover, it is even convenient in preventing certain inadequacies such as a "cogging" phenomenon which is generated in the case where rotor 4 is rotated with an external force.

In short, the present invention has been constituted as explained above. Namely, magnetization is carried out from the outside while the rotor is situated within the motor yoke 2. Regarding the power source for magnetization, the wire of the magnetizing coil may be made thinner since the current requirements are less, as the capacitor power source used provides a high voltage within a short application period. Therefore, the magnetizing coil may be made small in size which is more conducive to implementing multipolarity.

Moreover, in this case, since magnetization is carried out while the teeth of the rotor are stepped to an area of low magnetic flux density, there is no fear of generating nonuniform magnetization in the aforementioned stripped pattern (unlike magnetization using the capacitor power source with continuous rotation) Thereby, a high quality and high performance permanent magnet can be formed. Moreover, a reliable high performance rotary electric apparatus using permanent magnets rarely resulting in a "demagnetizing" phenomenon can be consistently provided.

What is claimed is:

1. A method for externally magnetizing metal pieces fixed on an internal circumference of a motor yoke of a rotary electric apparatus to a permanent magnetization state while a rotor is located within the motor yoke, the method comprising the steps of:
    incrementally rotating the rotor in its normal rotation direction after magnetizing the metal pieces by applying a voltage from a capacitor power source to a yoke magnetizing means adjacent an external circumference of the yoke; and
    further magnetizing said metal pieces after incremental rotation of said rotor by re-applying the voltage from the capacitor power source to the yoke magnetizing means.

2. An external magnetizing apparatus for magnetizing metal pieces fixed on an internal circumference of a motor yoke of a rotary electric apparatus to a permanent magnetization state while a rotor is located within the motor yoke, the apparatus comprising:
    yoke magnetizing means for generating a magnetic flux toward an adjacent external circumference of the motor yoke;
    power source applying means for supplying a voltage from a capacitor power source to the yoke magnetizing means;
    control means responsive to said power source applying means; and
    a step rotating means activated by said control means for incrementally rotating said rotor in its normal rotating direction after each application of voltage from said capacitor power source.

* * * * *